United States Patent
Lemanski

(10) Patent No.: US 9,817,686 B2
(45) Date of Patent: Nov. 14, 2017

(54) SYSTEMS AND METHODS FOR SECURING VIRTUAL MACHINES

(71) Applicant: THE BOEING COMPANY, Huntington Beach, CA (US)

(72) Inventor: Richard Matthew Lemanski, Glen Carbon, IL (US)

(73) Assignee: The Boeing Company, Chicago, IL (US)

(*) Notice: Subject to any disclaimer, the term of this patent is extended or adjusted under 35 U.S.C. 154(b) by 111 days.

(21) Appl. No.: 14/564,932

(22) Filed: Dec. 9, 2014

(65) Prior Publication Data
US 2016/0162313 A1    Jun. 9, 2016

(51) Int. Cl.
G06F 9/46 (2006.01)
G06F 9/455 (2006.01)
G06F 21/53 (2013.01)
H04L 29/06 (2006.01)
H04L 12/24 (2006.01)
H04L 29/08 (2006.01)

(52) U.S. Cl.
CPC ......... G06F 9/45558 (2013.01); G06F 21/53 (2013.01); H04L 41/00 (2013.01); H04L 63/123 (2013.01); G06F 2009/4557 (2013.01); G06F 2009/45587 (2013.01); H04L 67/10 (2013.01)

(58) Field of Classification Search
CPC ......... G06F 9/45558; G06F 2009/4557; G06F 2009/45587; G06F 21/53
See application file for complete search history.

(56) References Cited

U.S. PATENT DOCUMENTS

| | | | |
|---|---|---|---|
| 6,170,067 B1 * | 1/2001 | Liu ........................... | G06F 1/26 714/31 |
| 7,716,667 B2 * | 5/2010 | van Rietschote ... | G06F 9/45533 718/1 |
| 8,099,391 B1 | 1/2012 | Monckton | |

(Continued)

FOREIGN PATENT DOCUMENTS

| | | |
|---|---|---|
| EP | 1962192 A1 | 8/2008 |
| EP | 2309387 A1 | 4/2011 |
| WO | 2013039481 A1 | 3/2013 |

OTHER PUBLICATIONS

Search Report of Application No. GB1318649; dated Mar. 24, 2014; 4 pages.

*Primary Examiner* — Camquy Truong
(74) *Attorney, Agent, or Firm* — Armstrong Teasdale LLP

(57) ABSTRACT

A system includes a first computing device comprising a virtual machine (VM), a second computing device, and a third computing device coupled to the first and second computing devices. The third computing device includes a management module configured to migrate the VM from the first computing device to the second computing device. The management module is also configured to create a first signature of data associated with the VM stored by the first computing device over a first period of time and create a second signature of data associated with the VM stored by the first computing device over a second period of time. The management module is further configured to compare the first signature and the second signature throughout the migration process to determine whether the data has been altered and generate an alert when a difference between the first signature and the second signature is detected.

17 Claims, 3 Drawing Sheets

(56) References Cited

U.S. PATENT DOCUMENTS

| | | | |
|---|---|---|---|
| 8,375,003 B1* | 2/2013 | Afonso | G06F 11/1451 707/639 |
| 8,930,751 B2* | 1/2015 | Tandra Sistla | G06F 9/45558 714/10 |
| 9,262,212 B2* | 2/2016 | Lemanski | G06F 9/4856 |
| 2006/0259950 A1* | 11/2006 | Mattsson | G06F 21/6227 726/1 |
| 2007/0208918 A1 | 9/2007 | Harbin et al. | |
| 2007/0244938 A1 | 10/2007 | Michael et al. | |
| 2008/0222633 A1* | 9/2008 | Kami | G06F 9/45558 718/1 |
| 2009/0216970 A1 | 8/2009 | Basler et al. | |
| 2009/0313447 A1 | 12/2009 | Nguyen et al. | |
| 2010/0262585 A1 | 10/2010 | Rosikiewicz et al. | |
| 2010/0262586 A1 | 10/2010 | Rosikiewicz et al. | |
| 2010/0262797 A1 | 10/2010 | Rosikiewicz et al. | |
| 2011/0010515 A1 | 1/2011 | Ranade | |
| 2011/0085667 A1 | 4/2011 | Berrios et al. | |
| 2012/0209812 A1 | 8/2012 | Bezbaruah et al. | |
| 2012/0221529 A1 | 8/2012 | Rosikiewicz et al. | |
| 2013/0138791 A1 | 5/2013 | Thomas et al. | |
| 2013/0212579 A1 | 8/2013 | Ben-Shaul et al. | |
| 2013/0262250 A1 | 10/2013 | Lingafelt et al. | |
| 2014/0130040 A1 | 5/2014 | Lemanski | |
| 2015/0309828 A1* | 10/2015 | Shaik | G06F 9/5027 718/1 |

\* cited by examiner

SYSTEMS AND METHODS FOR SECURING VIRTUAL MACHINES

BACKGROUND

The field of the disclosure relates generally to computing systems, and more specifically, to systems and methods for securing virtual machines.

At least some known computing devices are arranged in a network to facilitate sharing data and resources between the computing devices. To enable a plurality of users to access the data and/or resources, a virtualized computing environment may be established in which one or more virtual machines (VMs) are executed on the computing devices. In such a network, the users may each access different VMs that share computing resources of one computing device, for example.

The VMs may be imaged or backed up to one or more remote storage devices and/or may be migrated to different computing devices in an attempt to balance resource usage among the computing devices and/or to increase a reliability of the network system. However, during backup and/or migration, various events may occur that can damage and/or destroy a VM, the computing devices, or virtualized computing environment. These systems and methods (backup/restore/etc) do not necessarily create VM damage/destruction but rather mitigate those risks.

BRIEF DESCRIPTION

In one aspect, a system is provided that includes a first computing device comprising a virtual machine (VM), a second computing device, and a third computing device coupled to the first and second computing devices. The third computing device includes a management module configured to migrate the VM from the first computing device to the second computing device. The management module is also configured to create a first signature of data associated with the VM stored by the first computing device over a first period of time and create a second signature of data associated with the VM stored by the first computing device over a second period of time. The management module is further configured to compare the first signature and the second signature throughout the migration process to determine whether the data has been altered and generate an alert when a difference between the first signature and the second signature is detected.

In another aspect, a method of securing a virtual machine (VM) is provided. The method includes migrating, by a management module executing on a processor, the VM from a first computing device to a second computing device. The method also includes creating a first signature of data associated with the VM stored by the first computing device over a first period of time and creating a second signature of data associated with the VM stored by the first computing device over a second period of time. The method further includes comparing the first signature and the second signature throughout the migration process to determine whether the data has been altered and generating an alert when a difference between the first signature and the second signature is detected.

The features, functions, and advantages that have been discussed can be achieved independently in various configurations or may be combined in yet other configurations, further details of which can be seen with reference to the following description and drawings.

DETAILED DESCRIPTION

Figure 1:
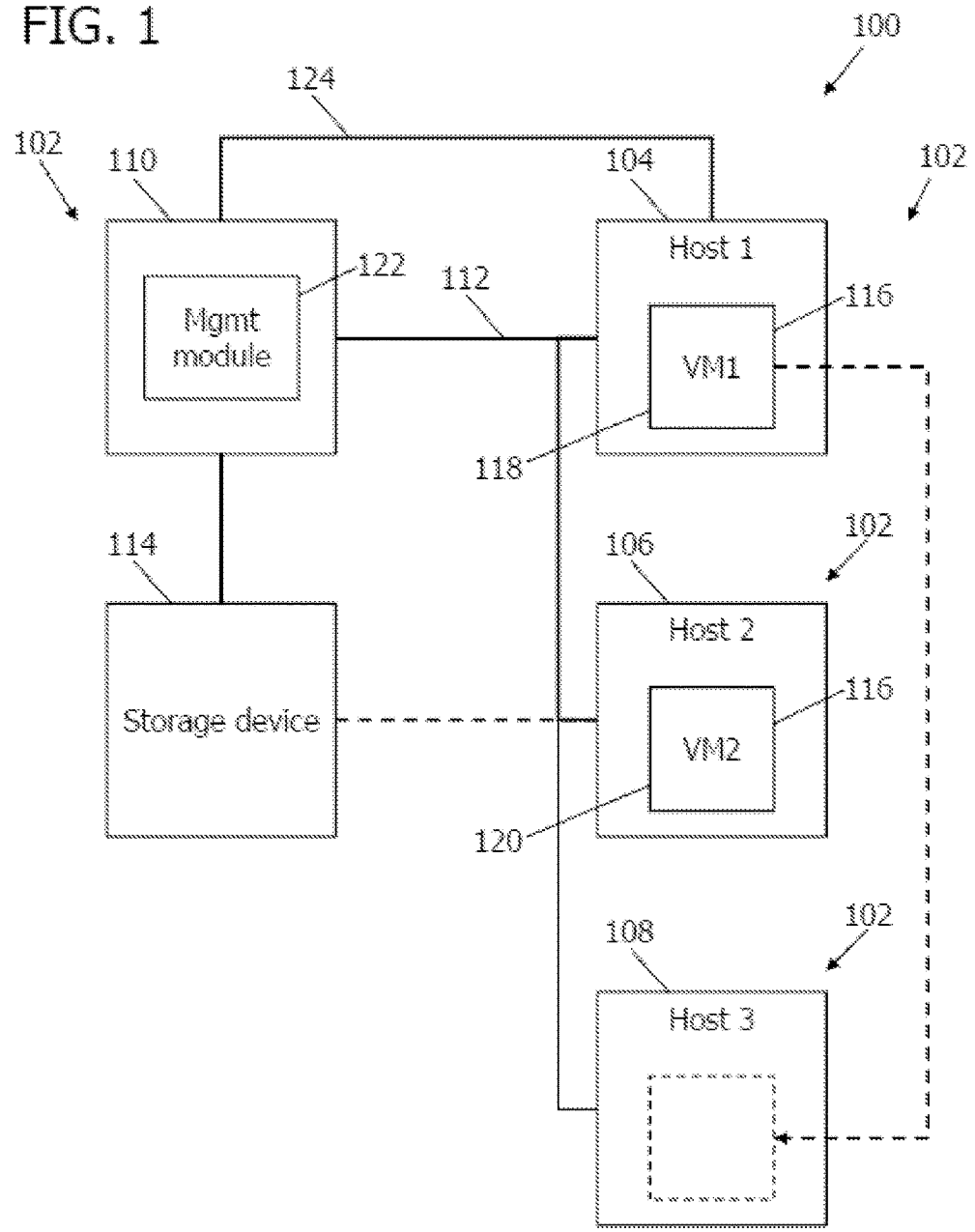
FIG. 1 illustrates an exemplary network system that includes a plurality of exemplary computing devices.

FIG. 1 is a block diagram of an exemplary network system 100. In the exemplary implementation, network system 100 includes one or more host computing devices 102 (also referred to herein as "hosts"), such as a first host 104, a second host 106, and a third host 108. Moreover, in the exemplary implementation, network system 100 also includes a fourth host computing device 110 (hereinafter referred to as a "management device") that is coupled to hosts 102 via a network 112, and one or more storage devices 114 that are communicatively coupled to management device 110 and to hosts 102, for example, via network 112. Alternatively, one or more subnetworks may be used to couple hosts 102, management device 110, and storage devices 114 together. While three hosts 102 are illustrated in FIG. 1, it should be recognized that any suitable number of hosts 102 may be included within network system 100.

In the exemplary implementation, hosts 102 are physical computing devices, such as servers or other computers, that execute a virtual execution environment in which one or more virtual machines ("VMs") 116 are instantiated and executed. Alternatively, one or more hosts 102 may be virtual computing devices, such as virtual servers or other virtual computers, that execute within a virtual execution environment of one or more physical computing devices.

In the exemplary implementation, hosts 102 and VMs 116 are part of a virtual infrastructure within network system 100. In one implementation, the virtual infrastructure is at least partially implemented using the ESXi hypervisor infrastructure provided by VMware, Inc., of Palo Alto, Calif. Alternatively, any suitable hypervisor or other infrastructure may be used within network system 100. For example, each host 102 may execute an ESXi brand hypervisor, or another hypervisor or infrastructure, to enable VMs 116 to be instantiated and executed within host 102.

Each VM 116 includes an operating system (OS) and may include one or more applications (neither shown) that may be executed within VM 116. For example, a user of VM 116 may remotely connect to host 102 and execute one or more applications within VM 116. While two VMs 116 (i.e., a first VM 118 and a second VM 120) are illustrated within FIG. 1, it should be recognized that any suitable number of VMs 116 may be included within network system 100. Moreover, in the exemplary implementation, each VM 116 includes a plurality of files that store data associated with VM 116. For example, each VM 116 includes, without limitation, a VM disk file that stores data for the files associated with VM 116, and one or more configuration files that include operational or configuration settings for VM 116. Each VM 116 may include one or more "snapshots," or backup images, of the files associated with VM 116, such as the VM disk file. Each snapshot includes one or more associated delta files that include changes to VM # and/or the VM disk file that have not been incorporated into the VM disk file (or into other files associated with VM 116). The files and/or the snapshots of VM 116 may be stored within host 102, and/or may be stored within one or more storage devices 114. In the exemplary implementation, a snapshot is not a backup but rather it is a point-in-time technology that provides a window of time where changes are held off to the side and at some later point a decision may be made to keep or discard those changes. Related functionality exists such that integrated snapshotting executed by management device 110 facilitates rapid testing to include or discard changes.

Storage devices 114 includes, for example, one or more hard drives, solid state drives, and/or any other device that stores files, such as files associated with VMs 116. Storage devices 114 may be arranged in a network attached storage (NAS) configuration, a storage area network (SAN), and/or any other configuration that enables network system 100 to function as described herein. Other examples of a storage device may include a local disk and/or an external USB drive.

Management device 110 includes a management module 122 for controlling and/or administering network system 100, such as hosts 102 and VMs 116. In the exemplary implementation, management device 110 executes a LINUX-based operating system, and management module 122 is a LINUX-based program executing within the operating system. Management module 122 facilitates enabling VMs 116 to be backed up, restored, migrated, suspended, resumed, cloned, inventoried (i.e., to obtain information about storage, networking, operating system, etc.), and upgraded within network system 100, as described more fully herein. For example, management module 122 enables first VM 118 to be migrated from first host 104 to third host 108. Accordingly, after first VM 118 has been migrated to third host 108, first VM 118 may begin executing within third host 108. Management module 122 also provides centralized monitoring of VMs 116, logging of events that occur on VMs 116, an Intrusion Detection System (IDS), and a dial-home in environments that leverage a LINUX/ESXi infrastructure.

Network 112 communicatively couples hosts 102, management device 110, and/or storage devices 114 together. In the exemplary implementation, network 112 is a wired gigabit Ethernet network. Alternatively, network 112 may be any other wired or wireless network that enables network system 100 to function as described herein. In one implementation, management device 110 is coupled to one or more hosts 102, such as first host 104, by a second network 124, such as a 10 gigabit Ethernet network 124. These methodologies also apply to systems that span a WAN.

Figure 2:
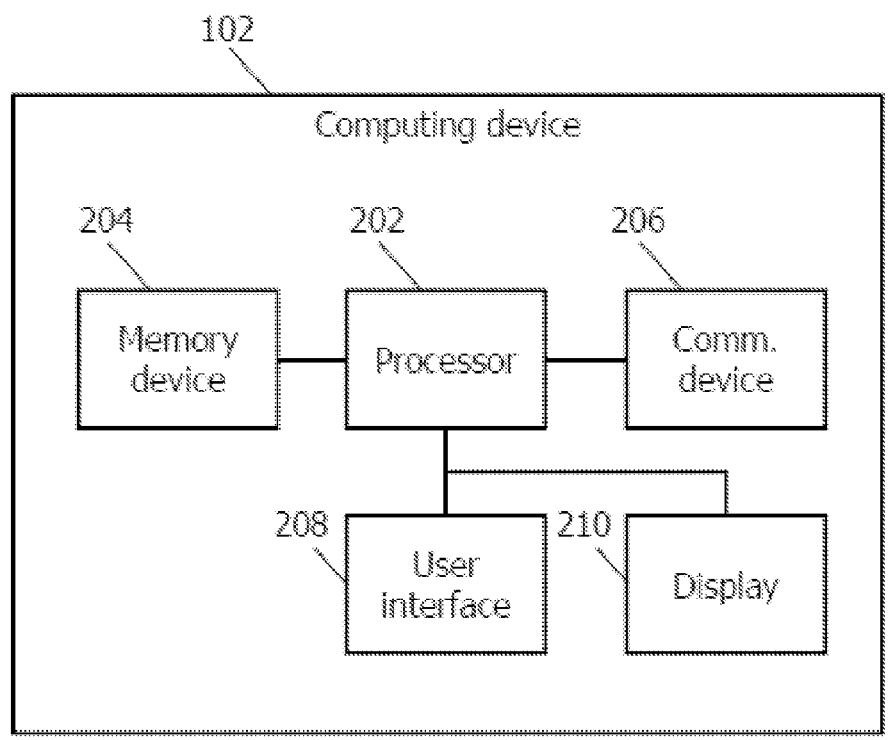
FIG. 2 is a block diagram of an exemplary computing device that may be used with the network system shown in FIG. 1.

FIG. 2 is a block diagram of an exemplary computing device 102 that may be used with network system 100 (shown in FIG. 1). For example, one or more of hosts 102, management device 110, management module 122, and VMs 116 may be implemented as, and/or executed by, one or more computing devices 102. In the exemplary implementation, computing devices 102 include one or more processors 202, memory devices 204, communication devices 206, user interfaces 208, and/or displays 210. It should be recognized that, in certain implementations, computing devices 102 may not include one or more components described herein. For example, a computing device 102 may be a rack-mounted server that does not include user interface 208 and display 210.

Processor 202 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 204 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary implementation, memory device 204 includes data and/or instructions that are executable by processor 202 (i.e., processor 202 is programmed by the instructions) to enable processor 202 to perform the functions described herein.

Communication device 206 may include, without limitation, a network interface controller (NIC), a network adapter, a transceiver, and/or any other communication device that enables network system 100 to operate as described herein. Communication device 206 may connect to network 112 using any suitable communication protocol. In the exemplary implementation, network 112 and communication device 206 use a wired Ethernet protocol.

User interface 208 includes, without limitation, a keyboard, a keypad, a touch-sensitive screen, a mouse, a scroll wheel, a pointing device, an audio input device employing speech-recognition software, and/or any suitable device that enables a user to input data into communication device 206 and/or retrieve data from communication device 206. Display 210 includes, without limitation, a liquid crystal display (LCD), a vacuum fluorescent display (VFD), a cathode ray tube (CRT), a plasma display, a light-emitting diode (LED) display, and/or any suitable visual output device capable of displaying graphical data and text to a user.

Figure 3:
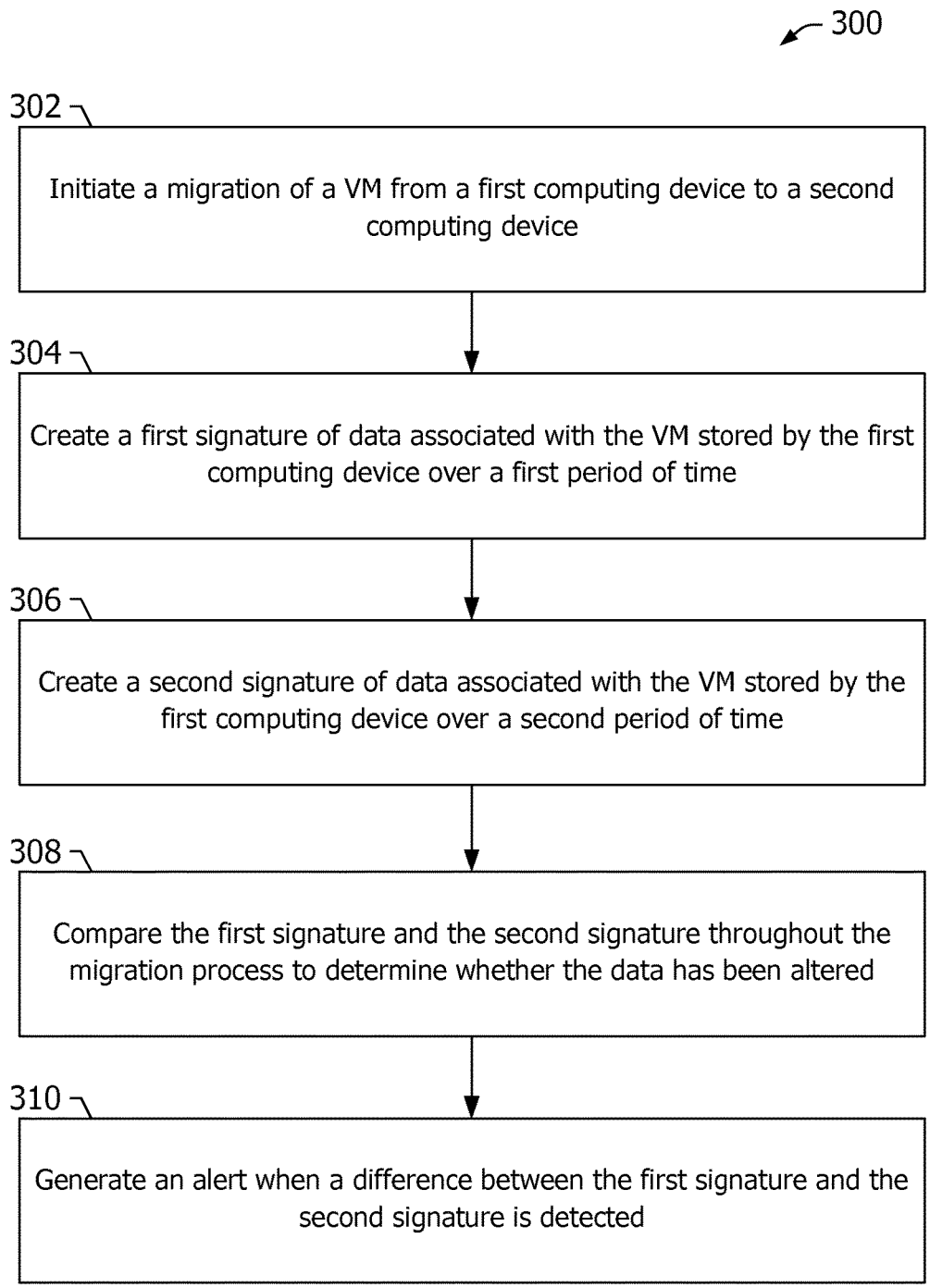
FIG. 3 is a flow diagram of an exemplary method of securing a virtual machine that may be executed by the network system of FIG. 1.

FIG. 3 is a flow diagram of an exemplary method 300 of securing VM 116 within network system 100 (shown in FIG. 1). In the exemplary implementation, method 300 is embodied within a plurality of computer-executable instructions (e.g., management module 122) that program processor 202 of management device 110 to perform the functions described herein. Accordingly, in the exemplary implementation, method 300 is at least partially executed by processor 202 of management device 110.

In the exemplary implementation, management module 122 initiates 302 a migration, or a migration operation, of VM 116 from first computing device 104 to second computing device 106. Management module 122 creates 304 a first signature of data associated with VM 116 stored by first computing device 104 over a first period of time. Management module 122 also creates 306 a second signature of data associated with VM 116 stored by first computing device 104 over a second period of time. The data includes at least one of key binaries, configuration files, source code, repository locations, and archive locations.

In the exemplary implementation, management module 122 compares 308 the first signature and the second signature to determine whether the data has been altered. Comparing the first signature and the second signature may further include actively hashing the data to insure it has not been tampered with.

Management module 122 generates 310 an alert when a difference between the first signature and the second signature is detected. Generating an alert may further include contacting a system administrator to provide information related to the first and second signatures for investigation. The system administrator is contacted in accordance with predefined contact methods. The predetermined contact methods are based on a time of day and/or a day of the week, and include an email, a text message, and/or a page. The above process describes protection against tamper while the VM files are in transit within the system. Another option related to the above feature would prevent the migration from occurring if the signatures/hashes do not match. A similar construct applies in that a hash is captured upon arrival at storage device 114. Once a restore/redeploy of that image is requested, a second hash is taken and compared to the first using similar alert mechanisms. This process ensures no tamper while the files are at rest.

In the exemplary implementation, management module 122 is also configured to monitor disk space associated with VM 116. To monitor disk space, management module 122 determines an amount of available disk space on VM 116 and compares the determined available disk space to a predetermined disk space threshold. When the determined available disk space is less than predetermined disk space threshold, management module 122 generates a low disk space condition notification for transmission to the system administrator in accordance with the contact methods described above. In response to the low disk space condition notification, management module 122 may automatically reduce virtual host disk utilization or increase VM disk space by a predefined amount. Alternatively, management module 122 may add or remove one or more VM computing resources (i.e., RAM, CPU, etc.) in response to the low disk space condition notification. There are different concepts at play when considering this scenario. Alert notifications are sent out when low disk thresholds are exceeded. Additional mechanisms may be automated to (a) auto-grow the VM disk if VM disk space is low; (b) auto-shrink VM disk space if VH (Virtual Host) disk space is low; and/or (c) add/remove VM resources (most likely, in this scenario, remove RAM to minimize swap space image).

In the exemplary implementation, management module 122 is configured to monitor a status of at least one critical server. To monitor a server status, management module 122 actively monitors network connectivity of at least one critical server. When an offline critical server is detected, management module 122 generates a downed server notification for transmission to the system administrator in accordance with the contact methods described above. In one implementation, in response to the downed server notification, management module 122 automatically powers up the offline critical server. In another implementation, management module 122 automatically restores the offline critical server using backup files for the offline critical server in response to the downed server notification. There are different concepts at play when considering this scenario. Alert notifications are sent out when downed systems are detected. Additional mechanisms may be automated on mission critical systems to: (a) auto-power up the downed VM; and/or (b) auto-restore the downed VM from the last backup.

In the exemplary implementation, management module 122 is also configured to provide protection from an over-temperature condition. Management module 122 monitors a temperature of first computing device 104 and/or second computing device 106. If the temperature associated with first computing device 104 and/or second computing device 106 exceeds a predetermined temperature threshold, management module 122 automatically shuts down first and/or second computing devices 104 and 106 to prevent damage to the hardware. Management module 122 may further target specific systems or subsets of systems for shutdown due to their proximity to the over-temperature location.

In the exemplary implementation, management module 122 is also configured to act as an Intrusion Detection System (IDS) to secure the management host. The IDS concept extends to the external virtual hosts managed by the management host. Acting as an IDS enables management module 122 to improve the security posture of the virtual management host such that server activities are logged and key binary/configuration files are MD5 (or like) hashed/monitored with text alerts going out when important changes occur. Off-shift and virtual host activity flags minimize pager chatter during on-shift hours. This capability extends to the virtual hosts managed as well.

In some implementations, first computing device 104 is executed as a virtual host on at least one physical computing device. In such implementations, management module 122 is configured to gather a plurality of security logs for the virtual host and to produce a reduced audit log over a specified time period to expedite review.

In an alternative implementation, management module 122 enables a specific VM disk to be backed up, restored, or redeployed/cloned, rather than the entire VM configuration. This provides enhanced support of VM environments with start/stop development cycles where changes to be restored are kept on a non-system disk to minimize outage impact and eliminates the need to catch up with system patching after a restore. Management module 122 executes a backup-disk function that enables VM host 102 to remotely shutdown one or more VMs 116, backup a target VM disk over Ethernet, and automatically power-on VMs 116. The backup-disk function preserves existing snapshots and includes a baseline option. Management module 122 also executes a restore-disk function that enables VM host 102 to remotely shut down a crashed VM, restore the most recent backup over top (destructive), and power-on the new VM. The restore-disk function acts as a compliment to the backup-disk function. The restore-disk function includes a baseline option and facilitates the use of thin or thick disks. The ability to backup or restore from baseline is a special capability that protects the image from normal auto-purge mechanisms; a related benefit of this configuration is the automated ability to save off a second backup or archive copy to further ensure it's safe-keeping. There also exists the ability to create a baseline image from a non-baseline image after the fact.

Cloning a single disk provides flexibility to mix and match VM system configurations, as needed. Additional automation enables an administrator to rename the VM inventory listing, VM directory, and other associated files of a VM to a new target name per current requirements. Management module 122 executes a redeploy-disk function that acts as a compliment to a redeploy function for individual disks. The redeploy function enables VM host 102 to leverage the most recent VM backup and redeploy it as a newly renamed VM (directory structure and files are renamed accordingly) on any available VM host in a non-destructive manner. The redeploy-disk function includes a baseline option and enables the use of thin or thick VM disks. While described herein as using the "most recent VM backup", management module 122 may target a specific dated backup to add further flexibility. The redeploy-disk process may be altered such that the data disk files are transferred live in substantially real-time and the system is shutdown only briefly to perform the file synch/rename. Further flexibility allows for taking an existing multi-disk backup or archive and altering it to produce a single disk backup or archive to infuse further flexibility into the virtual environment.

Management module 122 is further configured to manage and safe-guard critical baseline images. Management module 122 may perform backup, restore, cloning of images (of individual VM disks or entire VM configurations) as baseline/non-baseline, thick/thin disk, to/from original, or new server operations. Management module 122 defines critical images as baselines to safe-guard them from auto-purging past a defined image retention level because of their criticality. A second copy of the backup may be captured in a separately defined archive location.

A technical effect of the methods and systems described herein includes at least one of: (a) migrating, by a management module executing on a processor, the VM from a first computing device to a second computing device; (b) creating a first signature of data associated with the VM stored by the first computing device over a first period of time; (c) creating a second signature of data associated with the VM stored by the first computing device over a second period of time; (d) comparing the first signature and the second signature throughout the migration process to determine whether the data has been altered; and (e) generating an alert when a difference between the first signature and the second signature is detected. An additional capability would be to prevent the migration because the signatures do not match.

The implementations described herein provide an efficient and robust network system that enables virtual machines (VMs) to be backed up, restored, and migrated to new computing devices and/or storage devices in a secure manner. The VM is migrated from a first computing device to a second computing device. A first signature is created of data associated with the VM stored by the first computing device over a first period of time and a second signature is created of data associated with the VM stored by the first computing device over a second period of time. The first signature and the second signature are compared to determine whether the data has been altered. An alert is generated when a difference between the first signature and the second signature is detected. Hashes are captured when an image is initially taken, then taken again when that image needs to be restored/cloned to ensure data integrity/no tampering with VM image at rest. Hashes are also taken at various points in the migration process to ensure data integrity/no tampering while the VM image is in transit within the overall system. Alerting if there is not a match would be one feature while preventing the migration because of a no match condition would be a second feature.

Exemplary systems and methods for securing virtual machines are described above in detail. The systems and the methods are not limited to the specific implementations described herein but, rather, components of the systems and/or steps of the methods may be utilized independently and separately from other components and/or steps described herein. Further, the described operations and/or components may also be defined in, or used in combination with, other systems, methods, and/or networks, and are not limited to practice with only the network system as described herein.

The systems described herein are not intended to suggest any limitation as to the scope of use or functionality of any aspect of the disclosure. In addition, the systems described herein should not be interpreted as having any dependency or requirement relating to any one or combination of components illustrated in the exemplary operating environment.

The order of execution or performance of the operations in the disclosure illustrated and described herein is not essential, unless otherwise specified. That is, the operations may be performed in any order, unless otherwise specified, and the disclosure may include additional or fewer operations than those disclosed herein. For example, it is contemplated that executing or performing a particular operation before, contemporaneously with, or after another operation is within the scope of aspects of the disclosure.

Although specific features of various implementations may be shown in some drawings and not in others, this is for convenience only. In accordance with the principles of the disclosure, any feature of a drawing may be referenced and/or claimed in combination with any feature of any other drawing.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a first computing device comprising at least one processor and at least one memory device and executing a virtual machine (VM);
   a second computing device comprising at least one processor and at least one memory device; and
   a third computing device coupled to said first computing device and to said second computing device, said third computing device comprising a management module configured to:
   migrate the VM from said first computing device to said second computing device;
   create a first signature of data associated with the VM stored by said first computing device over a first period of time;
   create a second signature of data associated with the VM stored by said first computing device over a second period of time;
   compare the first signature and the second signature throughout the migration process to determine whether the data has been altered;
   generate an alert to a system administrator using a predetermined contact method when a difference between the first signature and the second signature is detected, wherein the alert includes information related to the first and second signatures for investigation; and
   prevent migration of the VM from said first computing device to said second computing device when a difference between the first and the second signatures is detected.

2. A system in accordance with claim 1, wherein to compare the first signature and the second signature, said management module is further configured to actively hash at least one of key binaries, configuration files, source code, repository locations, and archive locations.

3. A system in accordance with claim 1, wherein the predetermined contact method is based on at least one of a time of day and a day of the week, the predetermined contact method including one of an email, a text message, and a page.

4. A system in accordance with claim 1, wherein said management module is further configured to:

actively monitor network connectivity of at least one critical server;
generate a downed server notification when an offline critical server is detected;
automatically power up the offline critical server in response to the downed server notification; and
automatically restore the offline critical server using backup files for the offline critical server in response to the downed server notification.

5. A system in accordance with claim 1, wherein said management module is further configured to:
monitor a temperature of at least one of the first and second computing devices; and
shut down the at least one of the first and second computing devices and the VM when the temperature exceeds a predetermined temperature threshold.

6. A system in accordance with claim 1, wherein said management module is further configured to:
gather a plurality of security logs for the virtual host; and
produce a reduced audit log over a specified time period to expedite review.

7. A system in accordance with claim 1, wherein said management module is further configured to:
determine available disk space on the VM;
compare the determined available disk space to a predetermined disk space threshold; and
generate a low disk space condition notification when the determined available disk space is less than the predetermined disk space threshold.

8. A system in accordance with claim 7, wherein in response to the low disk space condition notification, said management module is further configured to at least one of:
add one or more VM computing resources in response to the virtual machine low disk space condition notification;
remove one or more VM computing resources in response to the virtual host low disk space condition notification;
automatically grow at least one of the virtual machine disk space and the virtual host disk space when the determined available disk space is less than the predetermined disk space threshold; and
automatically shrink the virtual machine disk space when disk space associated with a virtual host is less than the predetermined disk space threshold.

9. A method of securing a virtual machine (VM), said method comprising:
migrating, by a management module executing on a processor, the VM from a first computing device to a second computing device;
creating, by the management module, a first signature of data associated with the VM stored by the first computing device over a first period of time;
creating, by the management module, a second signature of data associated with the VM stored by the first computing device over a second period of time;
comparing, by the management module, the first signature and the second signature throughout the migration process to determine whether the data has been altered;
generating, by the management module, an alert to a system administrator using a predetermined contact method when a difference between the first signature and the second signature is detected, wherein the alert includes information related to the first and second signatures for investigation; and
preventing migration of the VM from said first computing device to said second computing device when a difference between the first and the second signatures is detected.

10. The method in accordance with claim 9, wherein comparing the first signature and the second signature further comprises actively hashing at least one of key binaries, configuration files, source code, repository locations, and archive locations.

11. The method in accordance with claim 9, wherein the predetermined contact method is based on at least one of a time of day and a day of the week, the predetermined contact method including one of an email, a text message, and a page.

12. The method in accordance with claim 9, further comprising:
determining available disk space on the VM;
comparing the determined available disk space to a predetermined disk space threshold; and
generating a low disk space condition notification when the determined available disk space is less than the predetermined disk space threshold.

13. The method in accordance with claim 12, further comprising at least one of:
adding one or more VM computing resources in response to the low disk space condition notification;
removing one or more VM computing resources in response to the low disk space condition notification;
automatically growing at least one of the virtual machine disk space and the virtual host disk space when the determined available disk space is less than the predetermined disk space threshold; and
automatically shrinking the virtual machine disk space when disk space associated with a virtual host is less than the predetermined disk space threshold.

14. The method in accordance with claim 9, further comprising:
actively monitoring network connectivity of at least one critical server; and
generating a downed server notification when an offline critical server is detected.

15. The method in accordance with claim 9, further comprising:
monitoring a temperature of at least one of the first and second computing devices; and
shutting down the at least one of the first and second computing devices and the VM when the temperature exceeds a predetermined temperature threshold.

16. The method in accordance with claim 9, wherein the first computing device is executed as a virtual host on at least one physical computing device, said method further comprises:
gathering a plurality of security logs for the virtual host; and
producing a reduced audit log over a specified time period to expedite review.

17. The method in accordance with claim 9, further comprising operating the management module as an Intrusion Detection System (IDS) to at least one of: secure the management host, secure external virtual hosts managed by the management host, improve the security posture of the virtual management host such that server activities are logged and key binary and configuration files are MD5 hashed, and reduce pager chatter during on-shift hours using off-shift and virtual host activity flags.

* * * * *